United States Patent [19]

Iwata et al.

[11] Patent Number: 4,986,850

[45] Date of Patent: Jan. 22, 1991

[54] RECORDING LIQUID:WATER COMPOSITION WITH 25 CP MINIMUM VISCOSITY AT 9:1 BLEND AND 15 CP MAXIMUM VISCOSITY AT 1:1 BLEND

[75] Inventors: Kazuo Iwata, Yokohama; Shinichi Tochihara, Hiratsuka; Shoji Koike, Yokohama, all of Japan

[73] Assignee: Canon Kabushiki Kaisha, Tokyo, Japan

[21] Appl. No.: 403,891

[22] Filed: Sep. 5, 1989

Related U.S. Application Data

[63] Continuation of Ser. No. 208,797, Jun. 20, 1988, abandoned, which is a continuation of Ser. No. 884,082, Jul. 10, 1986, abandoned.

[30] Foreign Application Priority Data

Jul. 15, 1985 [JP] Japan ................................ 60-155712

[51] Int. Cl.$^5$ ............................................. C09D 11/14
[52] U.S. Cl. ........................................ 106/25; 106/20; 106/22; 106/162
[58] Field of Search ...................... 106/20, 22, 162, 25

[56] References Cited

U.S. PATENT DOCUMENTS

| | | | |
|---|---|---|---|
| 4,196,006 | 4/1980 | Mansukhani | 106/22 |
| 4,285,727 | 8/1981 | Uehara et al. | 106/22 |
| 4,551,736 | 11/1985 | Suzuki | 346/140 R |
| 4,585,484 | 4/1986 | Haruta et al. | 106/22 |
| 4,601,756 | 7/1986 | Chiba et al. | 106/22 |

FOREIGN PATENT DOCUMENTS 2476668 8/1981 France .
1526017 9/1978 United Kingdom .

*Primary Examiner*—Amelia Burgess Yarbrough
*Attorney, Agent, or Firm*—Fitzpatrick, Cella Harper & Scinto

[57] ABSTRACT

A recording liquid including a mixture of a recording agent with a water-soluble organic solvent, and water, said mixture giving an aqueous solution having a viscosity of 25 cp or higher at a mixture-water ratio of 9:1 by weight, and giving an aqueous solution having a viscosity of 15 cp or lower at a ratio of 1:1 by weight at 25° C., respectively. A recording method is also provided which includes attaching droplets of the above-mentioned recording liquid onto a recording medium.

5 Claims, No Drawings

RECORDING LIQUID:WATER COMPOSITION WITH 25 CP MINIMUM VISCOSITY AT 9:1 BLEND AND 15 CP MAXIMUM VISCOSITY AT 1:1 BLEND

This application is a continuation of application Ser. No. 208,797, filed June 20, 1988, which is a continuation of Ser. No. 884,082, filed July 10, 1986, both of which are now abandoned.

BACKGROUND OF THE INVENTION

1. Field of the Invention

This invention relates to a recording liquid, a recording method and a method for forming color images by use thereof. It relates particularly to an ink jet recording method.

2. Related Background Art

Heretofore, various compositions have been reported for inks for use in ink jet printing.

Among them, comprehensive researches and developments from both aspects of composition and physical properties have been made regarding inks especially for printing on paper recording media.

However, some problems are involved in inks of the prior art for ink jet printing. The greatest problem is that the paper which is generally used in offices such as notebooks, reporting paper, copying paper, typewriting paper, letter paper, bond paper, continuous business forms, etc., cannot be used.

When ink jet printing is carried out on the various kinds of paper mentioned above by use of prior art ink, the ink will spread along the fibers of the paper, whereby the dot shape becomes indefinite to give rise to so-called feathering, with the result that fine lines and fine complicated letters collapse to become indistinct and not readable.

Further, the papers mentioned above are typically subjected to the treatment called "sizing" so that less feathering occurs when writing is manually performed with a writing implement particularly a fountain pen. Therefore, printer ink jet printer, ink does not easily penetrate into the paper and has a poor setting characteristic at the printed portion, whereby scratching of the print may occur by scraping of printed letters against the cover of a printer and ink may stain when the printed matter is smeared by a hand.

Accordingly, various improvements have been made in order to improve setting characteristic of printed letters. For example, there have been attempted the method in which pH is made strongly alkaline, the method in which a large amount of a surfactant is added into an ink or the method in which a water-soluble polymer is added in an ink, etc. The method of making an ink strongly alkaline is dangerous when the ink contacts skin and also involves the problem that both feathering and setting characteristic are not satisfactory for paper treated with a certain kind of sizing agent. On the other hand, the method in which a large amount of a surfactant is added may have the drawback that feathering occurs depending on the kind of paper, that the ink may retract from the orifice surface wets the entire orifice surface and not eject, etc. Further, the method in which a water-soluble polymer is added in the ink, even though some effects can be obtained with respect to feathering and setting characteristic of printed letters, the ink tends to crust at the orifice of the print head, whereby there has been the problem that normal ejection can not be effected when the printer is left to stand unoperated for several minutes.

Although various improvements other than those as described above have been attempted, there has been known no ink which can solve all the problems of feathering, setting characteristic of printed letters, crusting resistance at the print head, etc., as mentioned above.

SUMMARY OF THE INVENTION

An object of the present invention is to provide a recording liquid and a recording method which can be used for writing implements and various systems of ink jet printers and which have solved the problems encountered in the recording liquid of the prior art, namely feathering of the recording liquid when written or printed on a sized recording medium having fibers exposed on the surface to be recorded, slow setting characteristic of the written or printed matter, and the phenomenon of non-ejecting due to crusting of the recording liquid at the orifice when left standing for several minutes.

According to an aspect of the present invention, there is provided a recording liquid comprising a mixture of a recording agent with a water-soluble organic solvent, and water, said mixture giving an aqueous solution having a viscosity of 25 cp or higher at a mixture-water ratio of 9:1 by weight, and giving an aqueous solution having a viscosity of 15 cp or lower at said ratio of 1:1 by weight at 25° C., respectively.

According to another aspect of the present invention, there is provided a recording method which performs recording by attaching liquid droplets of a recording liquid onto a recording medium, said recording liquid comprising a mixture of a recording agent with a water-soluble organic solvent, and water, said mixture giving an aqueous solution having a viscosity of 25 cp or higher at a mixture-water ratio of 9:1 by weight, and having a viscosity of 15 cp or lower at said ratio of 1:1 by weight at 25° C., respectively, and said recording medium having been sized and having fibers exposed on the surface to be recorded.

According to further aspect of the present invention, there is provided a recording method which performs recording by attaching droplets of yellow, magenta, cyan, and black inks onto a recording medium, said recording liquid comprising a mixture of a recording agent with a water-soluble organic solvent, and water, said mixture giving an aqueous solution having a viscosity of 25 cp or higher at a mixture-water ratio of 9:1 by weight, and having a viscosity of 15 cp or lower at said ratio of 1:1 by weight of 25° C., and said recording medium having been sized and having fibers exposed o the surface to be recorded.

DETAILED DESCRIPTION OF THE PREFERRED EMBODIMENTS

The recording liquid of the present invention is required to have a viscosity of 10 cp (centipoise) or less at 25° C.

That is, if the viscosity of the recording liquid is higher than 10 cp, even when employed at room temperature, failure or discontinuity of ejection of an ink from an orifice tends to occur and, even if normal ejection may be effected, there is a tendency that non-ejecting may occur by slight change in temperature.

In the present invention it is essential that a solution of the mixture of the recording agent with the aqueous organic solvent dissolved in water at a mixture-water weight ratio of 9:1 should have a viscosity of 25 cp or higher at 25° C., preferably 29 cp or higher.

When the recording liquid is ejected from an orifice and attached onto a recording medium, evaporation of volatile components such as water in the recording liquid droplets will occur immediately thereafter, or otherwise penetration of the recording liquid into the recording medium will occur.

However, as described above when recording liquid droplets are attached onto a sized recording medium and having fibers exposed on the surface to be recorded, evaporation will occur prior to penetration.

Accordingly, the recording liquid droplets attached onto the recording medium will become more viscous due to evaporation of the volatile solvents such as water.

As a result of increase of the viscosity of the recording liquid droplets through evaporation of the volatile solvents such as water, the liquid droplets will lose fluidity, whereby it is rendered possible to maintain true round dot shapes without feathering Further, setting characteristic of printed matters in practical application becomes also satisfactory, even when printed matters are smeared with fingers or happen to be scraped by a cover of a printer, etc.

The present inventors have studied various recording liquid compositions with respect to the correlation among feathering of the recording liquid on paper, the setting characteristic of the printed letters and the viscosity of the recording liquid and consequently found that there is a close correlation between the viscosity at the above mixture-water weight ratio, and feathering of ink and setting characteristic of printed matters to accomplish the present invention.

By use of a recording liquid having such physical properties, it becomes possible to improve both the shape of dots and setting characteristic of printed matters, and also to print or write letters on a recording material subjected to sizing and having fibers exposed on the surface to be recorded.

Further, in the present invention, the viscosity of a solution of the mixture of the recording agent and the water-soluble organic solvent in water when the weight ratio of the mixture to water is made to be 1:1 to have a viscosity of 15 cp or less at 25° C.

For example, an ink jet printer performs printing by ejecting an ink through an orifice. In practical use of the printer, continuous printing will be rarely be performed, and usually after printing of several lines to some ten lines is performed, printing is stopped for several seconds to several minutes, and then printing is restarted.

In the recording liquids of the prior art, a water-soluble polymer is added into the recording liquid for improvement of the setting characteristic of printed matters and dot shape as described above.

In these recording liquids, increase of the viscosity will occur through evaporation of the volatile components in the recording liquid from the orifice surface during the time when it is left to stand for several seconds to several minutes. For this reason, failure of ejection may occur when printing is restarted after the stand-by.

Accordingly, in the printer of the prior art, it has been devised to put a cap on the print head when no printing is performed, but such a device involves disadvantages such that some time is required before restart of printing and that a complicated mechanism for capping is required.

Thus, it has been desired to have a recording liquid which will not cause non-ejecting even when left to stand for several minutes.

The present inventors have studied the correlation between the evaporating characteristic of the recording liquid at the orifice of a print head and its viscosity, and consequently found that good printing can be obtained without occurrence of non-ejecting phenomenon even after left to stand about ten minutes without capping a print head, provided that a solution of the mixture of the recording agent with the water-soluble organic solvent in water when dissolved at a mixture-water weight ratio of 1:1 has a viscosity of 15 cp or less at 25° C.

As the recording agent available in the present invention, either of dyes and pigments can be used and almost all of the water-soluble acidic dyes, direct dye, basic dyes and reactive dyes listed in Color Index can be used. Pigments can also be used under the state dispersed in an aqueous liquid medium.

Any of water-soluble dyes may be available, including those which are not listed in Color Index, and also any of the pigments which is dispersible in an aqueous liquid medium can be used.

The quantity of these recording agents is not particularly limited. Usually the quantity is in the range of from 1.0 to 10.0% by weight preferably 1.5 to 8.0% by weight based on the total weight of the recording liquid. The recording agent concentration less than 1% by weight is too low to yield images of good print quality, while the concentration higher than 10% by weight will cause an excess of the recording agent to remain on the paper surface, retard the setting, and impair the water-resistance.

The water-soluble organic solvent to be used in the present invention may include polyhydric alcohols such as ethylene glycol, diethylene glycol, triethylene glycol polyethylene glycol, thiodiethanol, propylene glycol, polypropylene glycol, ethylene oxide-propylene oxide copolymer, 1,3-butanediol, 1,4-butanediol, hexylene glycol, glycerin, etc., and derivatives thereof such as alkyl ethers, aryl ethers, etc , N-methyl-2-pyrrolidone, 1,3-dimethylimidazolidinone, sulforane, $\gamma$-butyrolactone, tetrahydrofurfuryl alcohol, diacetone alcohol, triethanolamine, etc. and their mixture.

The content of the organic solvent is in the range of from 5 to 50% by weight, preferably 10 to 40% by weight, and more preferably 10 to 35% by weight based on the total weight of the recording liquid.

The concentration lower than 5% by weight tends to cause the recording liquid to stick to the tip of the nozzle, thus resulting in a discharge trouble after prolonged standing, while the content higher than 50% by weight makes feathering of dots remarkable, giving lower quality of printed characters.

In this invention, the viscosity of the recording liquid can be adjusted effectively to fall within the specified range by selecting or combining the above-mentioned organic solvents, and further by optionally adding a particular water-soluble organic solvent such as an alkylene oxide additive of a polyhydric alcohol in a small quantity.

The addition of the alkylene oxide additive of a polyhydric alcohol in a small quantity facilitates the increase of the viscosity of liquid droplets attached on paper upon evaporation of water, reducing the feathering of dots, thereby improving the quality of the print.

The polyhydric alcohols for the alkylene oxide adducts include tri- or higher-hydric alcohols such as glycerin, hexose or its sugar-alcohol, pentose or its sugar-alcohol, oligosaccharide etc. added with ethylene oxide, propylene oxide, butylene oxide, tetrahydrofurane, or the like. The number of moles of alkylene oxide added per one mole of a polyhydric alcohol is in the range of from 1 to 50, preferably 2 to 25. The alkylene oxide added may be either a single species or plural species, and may be in a form of either a block copolymer or a random copolymer. The content of the alkylene oxide additive of the polyhydric alcohol is in the range of from 0.05 to 4% by weight, and preferably 0.05 to 2% by weight base on the total weight of the recording liquid. The content less than 0.05% by weight will fail to exhibit the effect of the addition, while the content higher than 4% by weight will result in an excessive increase of the viscosity, causing a trouble of the discharge.

The recording liquid of the present invention is composed mainly of the components as described above, but it may also contain various additives such as surfactants, pH controllers, rust preventives, preservatives, fungicides, antioxidants, evaporation promoters, chelating agents, etc., added therein.

The recording mediums suitable for use in the present invention are sized ones having cellulose fiber exposed outside of the recording surface, including paper generally used in offices such as notebooks, reporting paper, copying paper, typewriting paper, letter paper, bond paper, and continuous business forms. Among them, paper having a basis weight of 50–100 g/m$^2$, and having a Stoekigst sizing degree of 5–60 seconds specially matches with the recording liquid of the present invention.

The present invention is described in more detail by referring to the following Examples and Comparative examples, in which all % are by weight and viscosities (cp) are values at 25° C.

EXAMPLE 1

| | |
|---|---|
| C.I. Food Black 2 | 4.5% |
| C.I. Direct Yellow 86 | 0.3% |
| Diethylene glycol | 15.0% |
| Polyethylene oxide-propylene oxide adduct of glycerin (Average molecular weight: 600) | 1.5% |
| Water | 78.7% |

The above components were mixed throughly and dissolved in a vessel, and filtered by means of Fluoropore Filter (trade name, supplied by Sumitomo Denko K.K.) to prepare a recording liquid of the present invention.

Then the resulting recording liquid was charged in an ink jet printer, and printing was carried out. The result of the evaluation of the recording characteristics are shown in Table 1.

EXAMPLES 2-6

| | | |
|---|---|---|
| (2) | Dye of the formula | 3.8% |

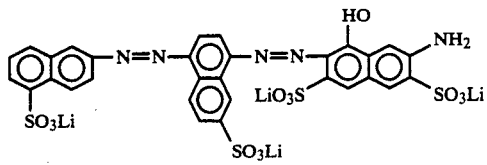

| | | |
|---|---|---|
| | Triethylene glycol | 10.0% |
| | Glycerin | 5.0% |
| | Polyoxyethylene polyoxypropylene block copolymer Ethylene oxide = propylene oxide = 8:2 (w/w) Average molecular weight: 1000 | 8.0% |
| | Water | 73.2% |
| (3) | C.I. Direct Black 154 | 1.6% |
| | Glycerin | 15.0% |
| | Ethylene glycol | 10.0% |
| | Polyoxyethylated sucrose Average 9.1 moles of ethylene oxide added | 0.1% |
| | Water | 73.3% |
| (4) | C.I. Direct Yellow 86 | 1.5% |
| | Glycerin | 10.0% |
| | Triethylene glycol | 5.0% |
| | Ethylene glycol | 10.0% |
| | Polyoxypropylated glycerin Average 6.0 moles of propylene oxide added | 0.2% |
| | Water | 73.3% |
| (5) | C.I. Acid Red 249 | 3.0% |
| | Ethylene glycol | 30.0% |
| | Polyethylene glycol 200 | 1.0% |
| | Polyoxyethylated sorbitol Average 8.3 moles ethylene oxide added | 0.3% |
| | Water | 65.7% |
| (6) | C.I. Direct Blue 199 | 3.5% |
| | Diethylene glycol | 15.0% |
| | Tetraethylene glycol dimethyl ether | 0.5% |
| | Polyoxyethylated pentaerythritol Average 7.2 moles ethylene oxide added | 0.2% |
| | EMULGEN 911 Tradename, polyethylene nonyl phenyl ether supplied by Kao Corp. | 0.001% |

| -continued | |
|---|---|
| Water | 80.8% |

Except for using the above respective compositions, recording liquids of the present invention were prepared in the same manner as in Example 1. Then the resulting recording liquids were charged to the printer and recording were carried out in the same manner as in Example 1. The results of the evaluation of the recording characteristics are shown in Table 1.

EXAMPLE 7

The four kinds of inks prepared in Example 1, 4, 5, and 6 were used for printing on the paper A, B, and C shown in Table 1 by employing an ink jet printer (PJ-1080A, manufactured by Canon K.K.) which had been partially modified. Sharp color images were obtained in all the cases with satisfactory drying characteristics of the print, without accompanying irregular feathering.

COMPARATIVE EXAMPLES 1-3

| (1) | C.I. Acid Red 249 | 3.0% |
|---|---|---|
| | Diethylene glycol | 20.0% |
| | Polyethylene glycol | 10.0% |
| | 1,3-dimethyl-2-imidazolidinone | 15.0% |
| | Water | 52.0% |
| (2) | C.I. Food Black 2 | 3.0% |
| | Diethylene glycol | 30.0% |
| | Polyethylene glycol 400 | 2.0% |
| | Water | 65.0% |
| (3) | C.I. Food Black 2 | 4.8% |
| | C.I. Direct Yellow 86 | 0.2% |
| | Polyethylene glycol | 35.0% |
| | Water | 60.0% |

Except for using the above respective compositions, recording liquids of the present invention were prepared in the same manner as in Example 1. Then the resulting recording liquids were charged to the printer and recording were carried out in the same manner as in Example 1. The results of the evaluation of the recording characteristics are shown in Table 1.

solvent dissolved in water at a mixture-water weight ratio of 1:1.

As to the printer, B represents an ink jet printer BJ-80 supplied by Canon K.K., and P represents an ink jet printer PJ-1080A supplied by Canon K.K., each being partly modified.

A, B, C, D, and E in Table 1 represent each the kind of paper used in the evaluation as shown below:
 A: Xerox 4024 (tradename, supplied by Xerox Corp.)
 B: Hammermill Bond (tradename, supplied by Hammermill Paper Co.)
 C: Wiggins Conqueror 80gsm Cream Laid (tradename, supplied by Wiggins Teape R & D Ltd.)
 D: Mead Cockle Bond (tradename, supplied by Mead Corp.)
 E: New OK High Quality Paper (tradename, supplied by Oji Paper Co., Ltd.)

Concerning setting characteristic of printed letters, 10, 20, 30, 40, 50 and 60 seconds after printing by the printer on a commercially available paper A, B, C, D, and E, the printed paper was rubbed against a Filter Paper No. 2 (trade name) produced by Toyo Roshi K.K., and judgment was conducted on the basis of the seconds before the printed matter was no longer contaminated (measured at temperature of 20° C.±5° C., and under relative humidity of 50±10%):
 ◎ : within 10 seconds,
 ○ : within 10–20 seconds,
 △: within 20–40 seconds,
 x: 40 seconds or longer.

As for the rate of feathering occurred, after printing 300 dots by a printer on a commercially available paper A, B, C, D, and E so that they may not contact with each other, followed by leaving standing unoperated for one hour or longer, and then the number of dots having generated feathering was counted under a microscope and evaluated by the percentage of feathered dots. (printed at 20±5° C., 50±10% RH):

TABLE 1

| | Viscosity (cp) | | | | Physical property of inks and results of printing | | | | | | | | | | | |
|---|---|---|---|---|---|---|---|---|---|---|---|---|---|---|---|---|
| | | | | | Setting characteristic of printed letters | | | | | Occurrence of feathering | | | | | Ejection stability on restart |
| | a | b | c | Printer | A | B | C | D | E | A | B | C | D | E | of printing |
| Example 1 | 2.6 | 41 | 8.1 | B | ○ | ○ | ◎ | ◎ | ○ | ○ | ○ | ○ | ○ | ○ | ○ |
| 2 | 3.1 | 58 | 9.6 | B | ○ | ○ | ◎ | ◎ | ○ | ○ | ○ | ○ | ○ | ○ | ○ |
| 3 | 3.3 | 29 | 7.8 | P | ○ | ○ | ○ | ○ | ○ | ○ | ○ | ○ | ○ | ○ | ○ |
| 4 | 3.4 | 32 | 11.1 | P | ○ | ○ | ○ | ○ | ○ | ○ | ○ | ○ | ○ | ○ | ○ |
| 5 | 3.8 | 34 | 13.1 | P | ○ | ○ | ○ | ○ | ○ | ○ | ○ | ○ | ○ | ○ | ○ |
| 6 | 2.2 | 39 | 12.0 | B | ◎ | ◎ | ◎ | ◎ | ○ | ○ | ○ | ○ | ○ | ○ | ○ |
| Comparative example 1 | 4.9 | 24 | 6.3 | P | △ | X | ○ | ○ | X | X | X | ○ | X | | ○ |
| 2 | 2.9 | 20 | 4.8 | B | X | X | △ | △ | X | X | △ | △ | △ | X | X |
| 3 | 4.7 | 60 | 20.5 | B | X | X | X | X | X | X | X | X | X | X | X |

In Table 1, viscosity "a" represents viscosity of each ink in Examples and Comparative examples.

Viscosity "b" represents the viscosity of a solution of a mixture of a recording agent and an aqueous organic solvent dissolved in water at a mixture-water weight ratio of 9:1.

Viscosity "c" represents the viscosity of a solution of a mixture of a recording agent and an aqueous organic o: 15% or less,
△: 16–40%,
x: 41% or more.

Ejection stability on restarting of printing was evaluated, after alphabet and numerical letters were printed continuously for 10 minutes with a predetermined ink charged to the printer, printing was stopped and the printer was left to stand under the state without attachment of a cap, etc., and then printing of alphabet and numerical letters was restarted. The evaluation was conducted regarding the presence of defective portions such as feathering and chipping letters, etc. (left to stand at 20°±5° C., 50±10% RH):

o: no defective portion from the first printed letter,
Δ: a part of the first printed letter feathered or defected,
x: the first letter not printed at all.

The recording liquid of the present invention can be applied for most of writing implements and ink jet printers, is excellent in rapid setting characteristic of the written matter of printed matter and further free from non-ejecting even when mounted on a printer or left to stand without capping for about ten minutes.

Also, when recording is performed by use of the recording liquid of the present invention on a recording medium which has been subjected to sizing and has fibers exposed on the surface to be recorded, namely papers generally used in offices such as notebooks, report paper, copying paper, typing paper, letter paper, bond paper, continuous business forms, etc., good drying characteristic of printed matter can be obtained without feathering of dots on the paper.

We claim:

1. A recording liquid composition comprising: (a) a recording agent, (b) a water-soluble organic solvent present in an amount from 5 to 50% by weight of the total recording liquid composition, (c) an alkylene oxide adduct of polyhydric alcohol, where the polyhydric alcohol is selected from the group consisting of glycerine, hexose, the sugar-alcohol of hexose, pentose, the sugar alcohol of pentose, and oligosaccharide, said alkylene oxide adduct being present in an amount from 0.05 to 4% by weight of the total weight of the recording liquid composition, and (d) water, wherein said composition is regulated to give a viscosity of 25 cp or higher at a blending ratio of the recording agent-organic solvent mixture to water of 9:1 by weight at 25° C., and to give a viscosity of 15 cp or lower at a blending ratio of 1:1 by weight at 25° C.

2. The recording liquid according to claim 1, wherein said aqueous solution has a viscosity of 29 cp or higher at a mixture-water ratio of 9:1 by weight, and has a viscosity of 14 cp or lower at said ratio of 1:1 by weight.

3. The recording liquid according to claim 1, wherein said alkylene oxide adduct is contained at a concentration ranging from 0.05 to 2% by weight based on the total weight of the recording liquid.

4. The recording liquid according to claim 1, wherein at least two kinds of said organic solvent are employed.

5. The recording liquid according to claim 1, wherein the content of the water is at least 65.7% by weight.

* * * * *

UNITED STATES PATENT AND TRADEMARK OFFICE
CERTIFICATE OF CORRECTION

PATENT NO. : 4,986,850

DATED : January 22, 1991

INVENTOR(S) : Kazuo Iwata et al.

It is certified that error appears in the above-identified patent and that said Letters Patent is hereby corrected as shown below:

COLUMN 1:

Line 40, "implement" should read --implement,--.

Line 41, "printer ink jet printer," should read --ink jet--.

Line 62, "surface wets" should read --surface or wets--.

COLUMN 3:

Line 21, "feathering Further," should read --feathering. Further,--.

COLUMN 5:

Line 14, "base" should read --based--.

COLUMN 6:

Line 26, "result" should read --results--.

UNITED STATES PATENT AND TRADEMARK OFFICE
CERTIFICATE OF CORRECTION

PATENT NO. : 4,986,850

DATED : January 22, 1991

INVENTOR(S) : Kazuo Iwata et al.

It is certified that error appears in the above-identified patent and that said Letters Patent is hereby corrected as shown below:

COLUMN 7:

Table 1, under "Occurrence of feathering":

```
    "A"                -- A --
     O                    O
     O      should        O
     O       read         O
     O                    O
     O                    O
     O                    O
                          O
     X                    X
     X                    X
```

Signed and Sealed this

Fifteenth Day of September, 1992

Attest:

DOUGLAS B. COMER

*Attesting Officer*     Acting Commissioner of Patents and Trademarks